US007376506B2

(12) United States Patent
Schueler

(10) Patent No.: US 7,376,506 B2
(45) Date of Patent: May 20, 2008

(54) METHOD FOR OPERATING AN INTERNAL COMBUSTION ENGINE

(75) Inventor: Matthias Schueler, Steinheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/274,955

(22) Filed: Nov. 14, 2005

(65) Prior Publication Data

US 2006/0122766 A1 Jun. 8, 2006

(30) Foreign Application Priority Data

Nov. 12, 2004 (DE) ...................... 10 2004 054 711

(51) Int. Cl.
*G01M 15/04* (2006.01)
*G06F 19/00* (2006.01)

(52) U.S. Cl. ....................................... 701/114; 123/435

(58) Field of Classification Search ................ 701/114, 701/111; 73/117.3, 116; 123/406.13, 406.27, 123/435, 436, 179.4, 406.41, 406.42; 702/41, 702/50
See application file for complete search history.

(56) References Cited

U.S. PATENT DOCUMENTS 4,466,278 A * 8/1984 Remus ........................ 73/115
6,196,184 B1 * 3/2001 Przymusinski et al. ...... 123/299
6,278,934 B1 * 8/2001 Yoon .......................... 701/111
6,650,994 B2 * 11/2003 Muhlberger et al. ......... 701/114
6,691,024 B2 * 2/2004 Kunz ......................... 701/114

FOREIGN PATENT DOCUMENTS

EP 0 661 433 7/1995

* cited by examiner

*Primary Examiner*—Willis R. Wolfe, Jr.
*Assistant Examiner*—Johnny H. Hoang
(74) *Attorney, Agent, or Firm*—Kenyon & Kenyon LLP

(57) ABSTRACT

A method for operating an internal combustion engine enables an improved determination of a preferred position of a shaft of the internal combustion engine. The preferred position of the shaft is derived here on the basis of a signal characterizing a course of combustion of the internal combustion engine as a function of a phase relation determined between this signal and the preferred position of the shaft.

12 Claims, 4 Drawing Sheets

METHOD FOR OPERATING AN INTERNAL COMBUSTION ENGINE

BACKGROUND INFORMATION

Methods for operating an internal combustion engine are known, in which a preferred position of a shaft of the internal combustion engine is determined. For example, providing an inductive sensor for internal combustion engines, which scans the teeth on the starter gear rim and determines a rotational speed value therefrom, is known from European Patent No. EP 0 661 433. Furthermore, the top dead center of at least one cylinder is marked by a marker. For this purpose, one tooth is omitted or a tooth is marked accordingly.

SUMMARY OF THE INVENTION

The method according to the present invention for operating an internal combustion engine has the advantage over the related art in that the preferred position of a shaft is derived from a signal characterizing a course of combustion of the internal combustion engine as a function of a phase relation determined between this signal and the preferred position of the shaft. In this manner, the preferred position of the shaft is determinable with the aid of the signal characteristic of the combustion of the internal combustion engine, so that, in particular, no marking, for example by way of a space or tooth having a different width, is needed in a sensor wheel to determine the position of the shaft. A worsening in the functions of the internal combustion engine caused by such a marking in the sensor wheel, which rely on precise information on the position of the sensor wheel, can consequently be avoided.

The phase relation between the signal characterizing the course of combustion of the internal combustion engine and the preferred position of the shaft may be determined quite easily as a phase relation between a specified position of the signal characterizing the course of combustion and the preferred position of the shaft.

The preferred position of the shaft may then be easily determined by first determining the specified position of the signal characterizing the course of combustion and determining therefrom the preferred position of the shaft, taking into account the phase relation determined. Only the simple operation of one phase addition is required for this purpose.

A position on a signal edge in a high-pressure phase of the internal combustion engine is in particular suitable as a specified position of the signal characterizing the course of combustion. There, the signal characterizing the course of combustion is synchronous with the angle of the shaft of the internal combustion engine. Thus, the described phase relation, and with it, the preferred position of the shaft as well, can be quite accurately determined with the aid of the signal characterizing the course of combustion.

It is furthermore advantageous if the position of the shaft is detected by a sensor and the preferred position of the shaft is determined as the position of the shaft detected by the sensor, which is in the determined phase relation to the signal characterizing the course of combustion. In this way, the preferred position of the shaft may be determined as before by the sensor with greater precision, for example in the location of a signal edge generated by a tooth of a sensor wheel designed as a toothed gear, whereas the position of the sensor wheel assigned to the preferred position of the shaft or the tooth assigned to this preferred position may be determined for the toothed gear designed as a toothed gear with less demands on the precision from the signal characterizing the course of combustion, while using the determined phase relation. The requirements for the precision of the signal characterizing the course of combustion may consequently be kept less stringent than the requirements for the precision for determining the position of the shaft by the sensor, in particular with the aid of the described sensor wheel.

Nevertheless, the precision of the determination of the preferred position of the shaft on the basis of the signal characterizing the course of combustion may be increased if the signal characterizing the course of combustion is filtered, in particular via a low-pass filter.

Furthermore, the evaluation of a signal edge is best suited for determining the phase relation as accurately as possible.

The use of a signal of a structure-borne noise sensor, in particular its low frequency component, or a signal of a cylinder pressure signal, is suitable in particular as a signal characterizing the course of combustion.

DETAILED DESCRIPTION

Figure 1:
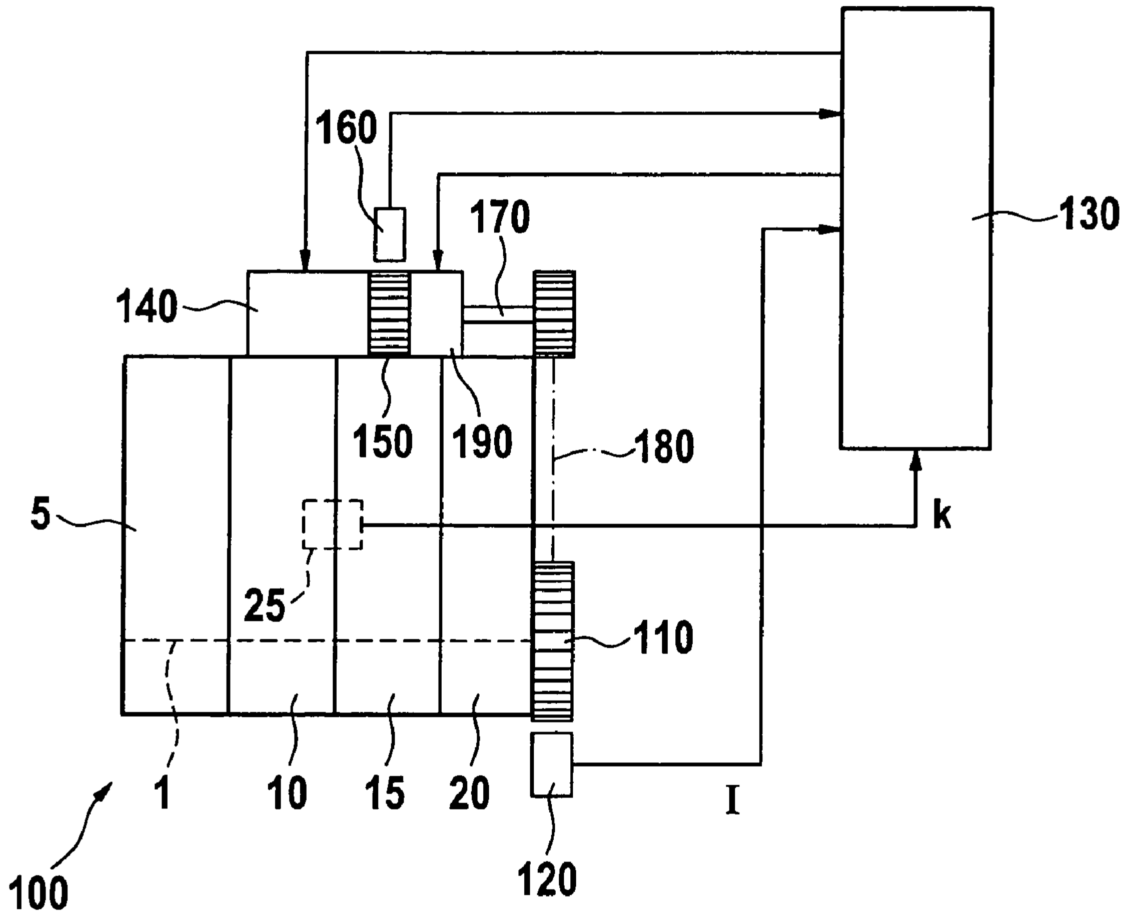
FIG. 1 shows a simplistic schematic representation of an internal combustion engine having an associated controller.

In the following, the method according to the present invention will be described using the example of a diesel engine. The described method is not limited to the application in diesel engines, however; it can also be applied to other types of internal combustion engines. In this case, corresponding elements must be replaced. Thus, for spark-ignited internal combustion engines, for example, similar meaning is given to the ignition point, as to the start of injection in diesel engines.

An internal combustion engine, in particular a diesel engine, is labeled 100. A starter gear ring 110 is positioned on a crankshaft 1 of the internal combustion engine. This is scanned by inductive sensor 120. Inductive sensor 120 supplies signals to control unit 130, in particular an EDC control unit (EDC=Electronic Diesel Control).

Fuel is metered to the internal combustion engine via a fuel pump 140. Fuel pump 140 is driven by a pump drive shaft on which increment wheel 150 is positioned. The increments of increment wheel 150 are scanned by increment sensor 160. Increment sensor 160 then supplies appropriate signals to EDC control unit 130.

The pump drive shaft is driven by camshaft 170 of the internal combustion engine, or the camshaft serves as a pump drive shaft. Camshaft 170 and the crankshaft are connected to one another through a driving means 180, in particular a toothed belt or a chain. The pump drive shaft can be moved relative to camshaft 170 using an injection timing gear 190.

As a function of the signals of different sensors which detect the various performance characteristics, EDC control unit 130 supplies control signals to fuel pump 140 and injection timing gear 190.

This device essentially works as follows: on the basis of different sensor signals, EDC control unit 130 computes a value for the injected quantity of fuel and the start of injection. Starting from these values, control unit 130 determines drive input pulses for driving injection timing gear 190, which establishes the start of injection. Furthermore, control unit 130 gives triggering pulses to fuel pump 140 for triggering an actuator for adjusting a quantity-determining final controlling element.

An inductive sensor 120 scans the teeth on starter gear ring 110. From this, control unit 130 recognizes the position of crankshaft 1. The top dead center of crankshaft 1 in the compression phase of one of the cylinders of internal combustion engine 100 is a preferred position of crankshaft 1. To achieve optimal fuel metering, the start of injection must be effected with respect to the above-mentioned top dead center of crankshaft 1. For this reason, a marking, which inductive sensor 120 recognizes, is provided on starter gear ring 110. The pulse generated on the basis of this marking is normally known as the reference pulse. Since a cycle of the cylinder spans a 720° crankshaft angle, i.e., 2 crankshaft rotations, the crankshaft position alone is not sufficient for determining whether the reference pulse formed by the marking on the starter gear ring 110 really indicates the top dead center of crankshaft 1 in the compression phase of the cylinder or the top dead center of crankshaft 1 in the expulsion phase of the cylinder. Since only one camshaft revolution takes place in each cycle, the compression stroke of the cylinder may be determined with the aid of a phase sensor on a camshaft sensor wheel. Increment wheel 150 may be used here as a camshaft sensor wheel and increment sensor 160 may be used as a corresponding phase sensor. Only those reference pulses of inductive sensor 120 which characterize the top dead center of crankshaft 1 in the compression phase or in the compression stroke of the cylinder are consequently determined as a result. These are shown in FIG. 2*b*.

Due to the assembly tolerances, there is a deviation between the position of the reference pulse and the top dead center of the crankshaft.

In order to achieve an accurate fuel metering, this deviation must be taken into account. Correction values are therefore to be determined, stored in a memory, and taken into account when calculating the triggering signals.

This determination of the correction values is preferably implemented EOL (End of Assembly Line) and/or at certain intervals. This means that the method for determining the correction values is executed by control unit 130 and/or by an external device at the end of manufacturing the internal combustion engine or the vehicle or following a repair of the same, during maintenance, or at certain time intervals.

In accordance with FIG. 1, internal combustion engine 100 includes, for example four cylinders 5, 10, 15, 20, which drive crankshaft 1 during operation in the manner known to those skilled in the art. A first cylinder is marked here with reference numeral 5, a second cylinder with reference numeral 10, a third cylinder with reference numeral 15, and a fourth cylinder with reference numeral 20. As shown with broken lines in FIG. 1, positioned between second cylinder 10 and third cylinder 15 is a structure-borne noise sensor 25, which detects a structure-borne noise of internal combustion engine 100 and supplies a corresponding measuring signal to control unit 130. This measuring signal will also be called structure-borne noise signal in the following and is characteristic of the combustion of internal combustion engine 100. The cycling sequence of cylinders 5, 10, 15, 20 here is as follows, for example: first cylinder 5—third cylinder 15—fourth cylinder 20—second cylinder 10. The structure-borne noise signal, which is indicated by the letter K in FIG. 1, plotted against crankshaft angle KW, for example, results in the diagram as per FIG. 2*a*.

Figure 2A:
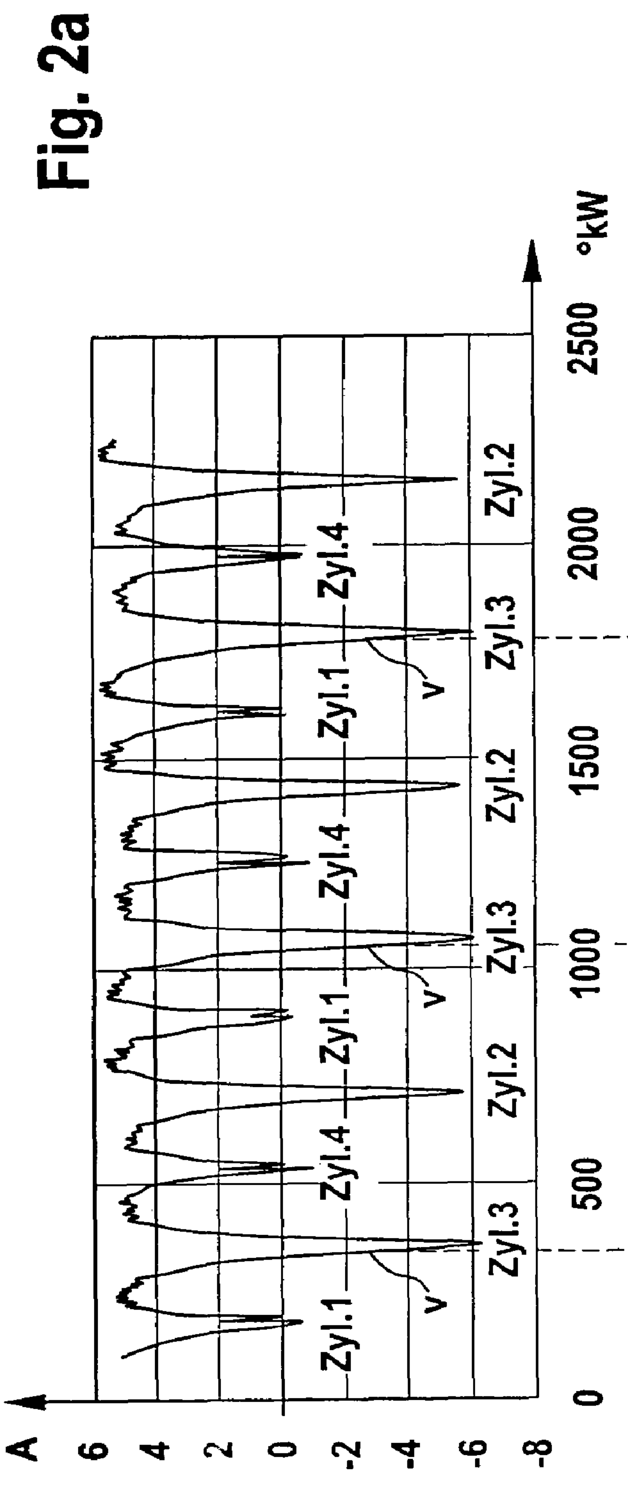
FIG. 2*a* shows the curve of the amplitude of a structure-borne noise sensor plotted against the crankshaft angle.
Figure 2B:
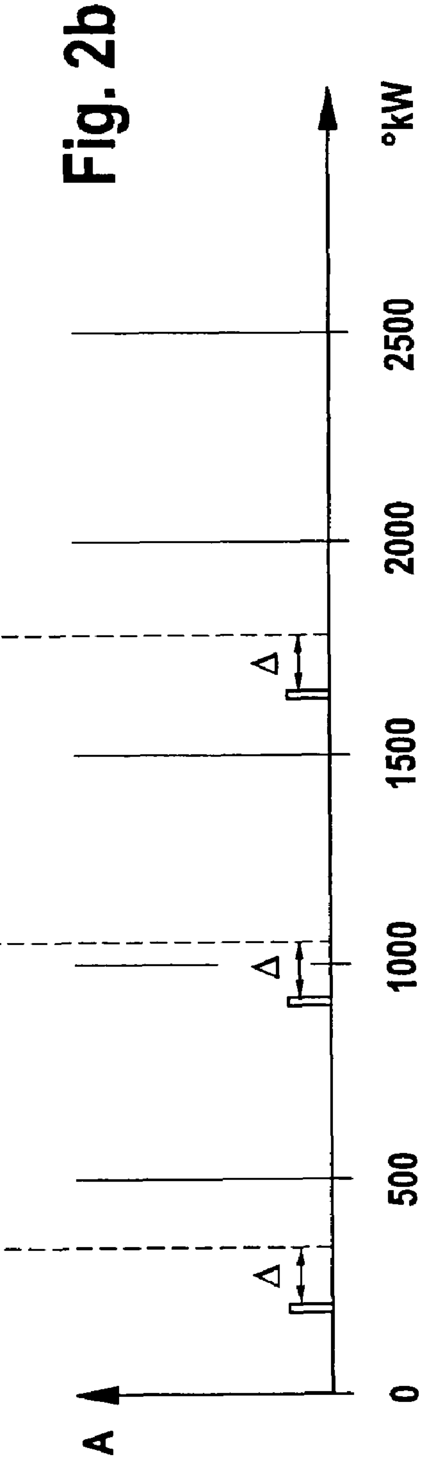
FIG. 2*b* shows the curve of the signal amplitude of a transmitter signal for detecting a top dead center of a crankshaft plotted against the crankshaft angle.

FIG. 2*a* in particular shows a low frequency component of the structure-borne noise signal. There, the amplitude of structure-borne noise signal K is plotted against crankshaft angle KW for a coasting operation of internal combustion engine 100. The negative signal peaks caused by the high pressure phases of cylinders 5, 10, 15, 20 working in the compression stroke may be recognized here quite distinctly. The negative signal peaks having a lesser amplitude originate from the compression strokes of first cylinder 5 and fourth cylinder 20, with their negative signal peaks alternating over crankshaft angle KW. The negative signal peaks having a greater amplitude originate from the high pressure phases of the compression strokes of second cylinder 10 and of third cylinder 15 and likewise alternate over crankshaft angle KW. For illustration, in FIG. 2*a*, each negative signal peak is indicated together with the associated cylinder which generated it, first cylinder 5 being labeled as “Cyl. 1,” second cylinder 10 as “Cyl. 2,” third cylinder 15 as “Cyl. 3,” and fourth cylinder 20 as “Cyl. 4.” The amplitudes of the negative signal peaks caused by second cylinder 10 and third cylinder 15 are greater than those of the signal peaks caused by first cylinder 5 and by fourth cylinder 20. This is because structure-borne noise sensor 25 is positioned between second cylinder 10 and third cylinder 15 and therefore records the structure-borne noise values generated by these two cylinders stronger than it does the structure-borne noise values generated by first cylinder 5 and fourth cylinder 20. As a function of the polarity of structure-borne noise sensor 25, the structure-borne noise signal may also be inverted, i.e., have a reversed polarity sign, and the evaluation must then be adapted accordingly.

FIG. 2*b* shows the signal of inductive sensor 120, which is indicated in FIG. 1 by the letter I. The variation of the amplitude of the signal of inductive sensor 120 in FIG. 2*b* is likewise shown plotted against crankshaft angle KW. On account of the marking on starter gear ring 110, which may be implemented as described in European Patent No. EP 0 661 433, by leaving out a tooth, for example, the top dead center of crankshaft 1 may be detected from signal I of inductive sensor 120 as the preferred position of crankshaft 1, in which in the present example, this top dead center corresponds to the top dead center of the piston of first cylinder 5 in the compression stroke. In FIG. 2*b*, only the above-described reference pulses of the signal of inductive sensor 120 are shown. It is apparent that these reference pulses occur at the same crankshaft angles at which, as per FIG. 2*a*, structure-borne noise signal K exhibits a negative signal peak for first cylinder 5. Thus, it can be inferred from FIGS. 2*a* and 2*b* that the phase between the signal peaks of structure-borne noise signal K and signal I of inductive sensor 120 is constant, equal to zero in the described example, because the reference pulses of signal I of inductive sensor 120 with reference to the crankshaft angle having the negative signal peaks of structure-borne noise signal K for first cylinder 5 coincide. In general, however, there could be any phase shift between signal I of inductive sensor 120 and structure-borne noise signal K, with this phase shift always being constant. In general, the reference pulses of signal I of inductive sensor 120 are therefore always in a fixed, i.e., constant phase relation to the curve of structure-borne noise signal K. Thus, it is provided that the top dead center of crankshaft 1 be derived from structure-borne noise signal K as a function of the phase relation determined between structure-borne noise signal K and the top dead center of crankshaft 1.

In a calibration phase of internal combustion engine 100, the curve of the signal of inductive sensor 120 as per FIG. 2*b* is recorded, for example, using a conventional starter gear ring 110 having the described marking for the top dead center of crankshaft 1, and compared with the structure-borne noise signal K determined by structure-borne noise sensor 25 as per FIG. 2*a* in control unit 130. For this purpose, a position of structure-borne noise signal K is fixedly specified and the phase relation between this specified position of the structure-borne noise signal and the top dead center of crankshaft 1 is determined in accordance with the reference pulses as per FIG. 2*b*. Thus, in the example of FIG. 2, a position on a signal edge of structure-borne noise signal K in a high pressure phase of internal combustion engine 100, i.e., during the compression stroke of one of cylinders 5, 10, 15, 20, is selected as the specified position of structure-borne noise signal K. The advantage is that the low frequency structure-borne noise signal K is synchronous with the angle of crankshaft 1, especially in the compression strokes. A signal edge is best suited for evaluating structure-borne noise signal K to determine the angle as accurately as possible. For example, such a signal edge can be selected in the high pressure phase, where approximately 50% of the amplitude of structure-borne noise signal K is present. This amplitude is also known as the signal excursion of structure-borne noise signal K.

In FIG. 2*a*, the specified position of structure-borne noise signal K is indicated by the letter V. FIG. 2*a* shows that specified position V of structure-borne noise signal K is in each case on a negative signal edge, which indicates a high pressure phase in the compression stroke of third cylinder 15 and is in approximately 50% of the corresponding signal excursion, as described. As per FIG. 2*b*, it can be discerned that the phase relation between position V of structure-borne noise signal K specified in each case and the nearest reference pulse of signal I of inductive sensor 120 as per FIG. 2*b* is formed by a constant phase difference (Δ).

In normal operation of internal combustion engine 100, i.e., in operating internal combustion engine 100 after a completed adjustment phase, a starter gear ring 110 without the marking of the top dead center of crankshaft 1, i.e., in particular without omitting a tooth, may be used for such a marking. The top dead center of crankshaft 1 is then determined as follows: First, specified position V of structure-borne noise signal K in control unit 130 is determined. On the basis of this specified position V, phase difference Δ of specified position V determined in the adjustment phase is added thereto, thus reaching a new phase position that corresponds to the top dead center of crankshaft 1. Moreover, the position of crankshaft 1 is detected in a conventional manner by inductive sensor 120 via pulses of the signal of inductive sensor 120, which are not shown in FIG. 2*b* and which are caused by the other teeth of starter gear ring 110. The top dead center of crankshaft 1 is then determined by control unit 130 as the position of crankshaft 1 detected by inductive sensor 120, the crankshaft being in the phase relation to structure-borne noise signal K determined in the adjustment phase. This means that the pulse of signal I of inductive sensor 120 is recognized as being assigned to the top dead center of crankshaft 1, which differs from the specified position V of structure-borne noise signal K by phase difference Δ, determined in the adjustment phase. Thus, the high precision of the measurement by inductive sensor 120 on account of the scanned teeth on starter gear ring 110 will continue to be used to determine the top dead center of crankshaft 1. This starter gear ring 110 may be designed as a toothed gear, for example, with 60 small teeth at a 6 degree crankshaft angle for tooth and space. For the structure-borne noise signal K, only a precision of ±½ of a small tooth, i.e., ±3 degree crankshaft angle KW, is required, since it need only be determined by structure-borne noise signal K that the correct tooth of starter gear ring 110 is selected as a reference point for the top dead center of crankshaft 1. The actual precision for determining the top dead center of crankshaft 1 is ensured here through the precision of the mounting of starter gear ring 110 on crankshaft 1 of internal combustion engine 100. Structure-borne noise signal K itself can be kept free from interference by filtering it, for instance, for which a low-pass filter may be used, in particular. In this way, the determination of the specified position V, and consequently of phase difference Δ for each operating cycle as well, becomes more accurate.

In accordance with the flow chart as per FIG. 3, the sequence for determining the phase relation between structure-borne noise signal K and the position of starter gear ring 110 for the top dead center of crankshaft 1 will now be described. The program may be run through during an adjustment phase of internal combustion engine 100, for instance. After the start of the program, at a program point 200, control unit 130 executes a filtering, in particular a low-pass filtering or a bandpass filtering, of structure-borne noise signal K detected by impact sound sensor 25. Higher-frequency interference is removed from structure-borne noise signal K in this manner. Afterwards, the program branches to point 215.

At program point 205, control unit 130 determines in the described manner specified position V in structure-borne noise signal K. Afterwards, the program branches to point 210.

At program point 210, control unit 130 determines likewise in the described manner, for example using a starter gear ring 110 having a marking, in particular by omitting a tooth, the positions of starter gear ring 110 for the top dead center of crankshaft 1 with the aid of the described reference pulses shown in FIG. 2*b*, the positions corresponding to the top dead center of crankshaft 1. Afterwards, the program branches to point 205.

At program point 215, control unit 130 determines in the described manner phase difference Δ between a reference pulse characterizing the top dead center of crankshaft 1 in signal I of inductive sensor 120, which results from the marking of starter gear ring 110, and specified position V of structure-borne noise signal K nearest to this reference pulse. Here, phase difference Δ is equal to the difference of the phase, i.e., the crankshaft angle of a reference pulse of signal I of inductive sensor 120 less the phase, i.e., the crankshaft angle of specified position V of structure-borne noise signal K nearest to the reference pulse. The program is then exited.

Figure 3:
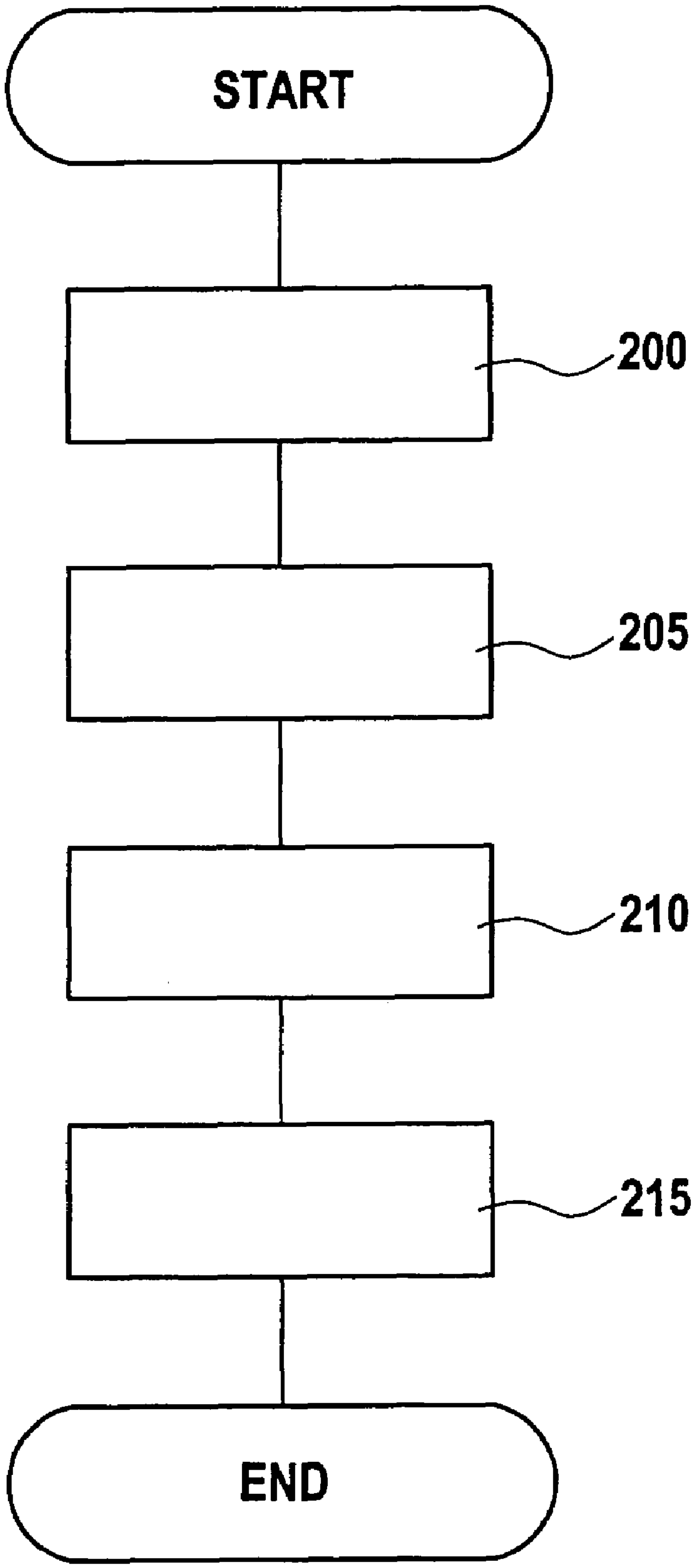
FIG. 3 shows a flow chart for determining a phase relation.
Figure 4:
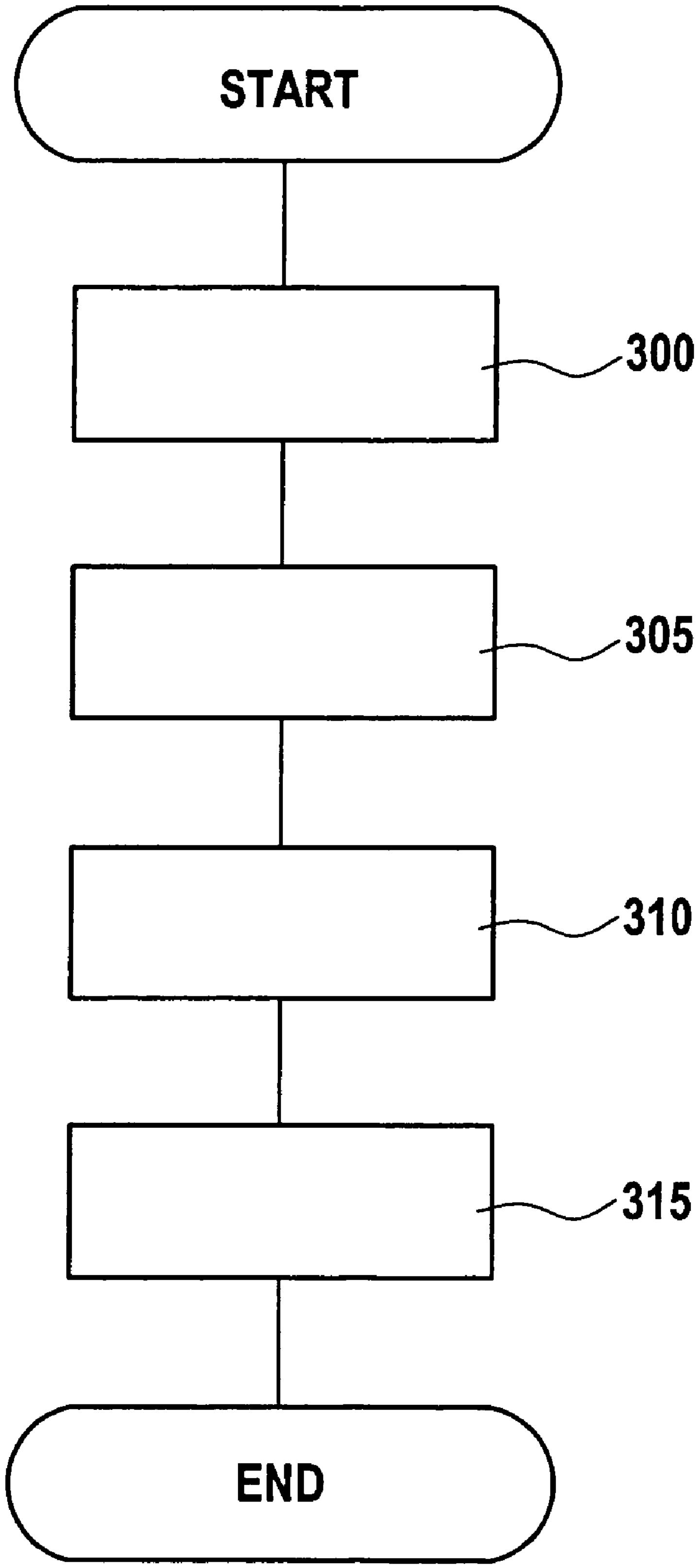
FIG. 4 shows a flow chart for determining the top dead center of the crankshaft.

A flow chart for an exemplary sequence for recognizing the top dead center of crankshaft 1 is shown in FIG. 4. This program will be run through in the normal operation of internal combustion engine 100 upon conclusion of the adjustment phase and determination of phase difference Δ, as shown in the flow chart of FIG. 3. After the start of the program, control unit 130 determines in the described manner at a program point 300 the specified position V of structure-borne noise signal K detected by structure-borne noise sensor 25. The program then branches to point 305.

At program point 305, control unit 130 adds phase difference Δ determined in accordance with the flow chart as per FIG. 3, for example, to the crankshaft angle associated with specified position V of structure-borne noise signal K, and as a result, obtains the crankshaft angle, which is measured by inductive sensor 120 as the crankshaft angle of the top dead center of crankshaft 1. For this above-described normal operation, starter gear ring 110 must no longer have any marking for the top dead center of crankshaft 1. The tooth of starter gear ring 110, which is associated with the crankshaft angle determined in program point 305, thus delivers during signal I of inductive sensor 120 a pulse that characterizes the top dead center of crankshaft 1. The crankshaft angle determined in program point 305 is then assigned to the corresponding pulse of signal I of inductive sensor 120 by control unit 130 at a subsequent program point 310. The program then branches to point 315.

At program point 315, control unit 130 marks the pulses of signal I of inductive sensor 120 as being associated with the top dead center of crankshaft 1, the pulses being at a distance from the pulse for the top dead center of crankshaft 1 determined at program point 310 of an integral multiple of a 720 degree crankshaft angle. Without any special marking on starter gear ring 110, the top dead center may thus be determined as the position of crankshaft I detected by inductive sensor 120, the position being in the phase relation, defined by phase difference Δ, with respect to the specified position V of structure-borne noise signal K. The program is subsequently exited.

In the previously described example, inductive sensor 120 was used to scan the teeth of starter gear ring 110. The present invention is not limited to the use of such an inductive sensor, however. Rather, any suitable sensor may be used to scan the teeth of starter gear ring 110. A sensor which optically scans the teeth of starter gear ring 110 is also suitable in particular. Starter gear ring 110 is also described only as an example, in which the position or the angle of crankshaft 1 may generally be placed in a scannable form in any desired manner, in which in the case of an optical sensor the use of an optical storage target as a sensor wheel may also be suitable, for example. The present invention is thus applicable in a similar manner to any sensor for determining the angle or the position of crankshaft 1. Furthermore, the shaft need not necessarily be crankshaft 1 of internal combustion engine 100. Alternatively, it may also be the camshaft or the pump motor shaft. Furthermore, the preferred position of the shaft also need not be the top dead center. Rather, any position of the shaft may be specified as the preferred position. The use of structure-borne noise signal K as the signal characterizing the course of combustion is advantageous because the use of structure-borne noise sensors for electronic knock control in spark ignition engines, for example, is already provided anyway. Future use of structure-borne noise sensors will become of greater interest to diesel engines as well. The structure-borne noise signal will be used there, for example, for calibration, adjustment, and optimization of the pilot injection in conventional combustion methods.

The angle information of crankshaft 1 derived from signal I of inductive sensor 120 may be used to determine the speed of internal combustion engine 100, for example. The speed may in turn be used to determine a torque of internal combustion engine 100 or to recognize the phase position of the engine or to compute for the start of control for fuel injection.

As an alternative to using the structure-borne noise signal, a cylinder pressure signal may also be used as the signal of internal combustion engine 100 characterizing the combustion. This cylinder pressure signal may be determined via one or several cylinder pressure sensors in one or several cylinders of internal combustion engine 100. Thus, the variation over time of the cylinder pressure signal of first cylinder 5 may be evaluated similarly to the structure-borne noise signal by control unit 130 in the described manner in order to determine the phase relation to the preferred position of crankshaft 1, for example, once again relative to the top dead center of crankshaft 1. Thus, the preferred position of crankshaft 1 may be derived in a similar manner from the cylinder pressure signal. The cylinder pressure signal exhibits a maximum at the top dead center of crankshaft 1. A similarly predefined position of the cylinder pressure signal may again be chosen on an angle-synchronous signal edge of the cylinder pressure signal.

The signal of inductive sensor 120 is not considered here as a signal characterizing the course of combustion of internal combustion engine 100 because, unlike structure-borne noise signal K or the cylinder pressure signal, it does not allow a distinction to be made among different combustion phases or strokes. A signal characterizing the course of combustion of internal combustion engine 100, however, allows just such a distinction to be made or at least one concrete combustion phase to be recognized. Thus, structure-borne noise signal K and the cylinder pressure signal allow at least one compression phase of one cylinder to be unambiguously recognized in contrast to the signal of inductive sensor 120.

As the signal characterizing the course of combustion, the signal of a wire resistance strain gauge may also be used alternatively, the latter being mounted in such a way that it detects the elongation caused by compression and expansion of at least one of the cylinders of internal combustion engine 100.

What is claimed is:

1. A method for operating an internal combustion engine comprising:

deriving a preferred position of a shaft of the internal combustion engine based on a signal characterizing a course of combustion of the internal combustion engine as a function of a phase relation determined between the signal and the preferred position of the shaft.

2. The method according to claim 1, further comprising determining the phase relation between a specified position of the signal characterizing the course of combustion and the preferred position of the shaft.

3. The method according to claim 2, wherein to determine the preferred position of the shaft, the specified position of the signal characterizing the course of combustion is first determined and the preferred position of the shaft is determined therefrom, taking into account the determined phase relation.

4. The method according to claim 2, wherein a position on a signal edge in a high pressure phase is selected as a specified position of the signal characterizing the course of combustion.

5. The method according to claim 4, wherein a position on the signal edge corresponding to about half of a signal excursion in the associated high pressure phase is selected as the specified position of the signal characterizing the course of combustion.

6. The method according to claim 1, further comprising detecting a position of the shaft by a sensor, and wherein the preferred position of the shaft is ascertained as the position of the shaft detected by the sensor, which is in the determined relation of the phase to the signal characterizing the course of combustion.

7. The method according to claim 1, further comprising filtering the signal characterizing the course of combustion.

8. The method according to claim 7, wherein the signal is filtered via a low-pass filter.

9. The method according to claim 1, wherein a signal of a structure-borne noise sensor is selected as the signal characterizing the course of combustion.

10. The method according to claim 9, wherein a low frequency component of the signal of the sensor is selected.

11. The method according to claim 1, wherein a cylinder pressure signal is selected as the signal characterizing the course of combustion.

12. The method according to claim 1, wherein a signal of a strain gauge is selected as the signal characterizing the course of combustion.

* * * * *